United States Patent
Han et al.

(10) Patent No.: US 10,116,680 B1
(45) Date of Patent: Oct. 30, 2018

(54) SYSTEMS AND METHODS FOR EVALUATING INFECTION RISKS BASED ON PROFILED USER BEHAVIORS

(71) Applicant: Symantec Corporation, Mountain View, CA (US)

(72) Inventors: Yufei Han, Antibes (FR); Leylya Yumer, Antibes (FR); Pierre-Antoine Vervier, Alpes-Maritimes (FR); Matteo Dell'Amico, Valbonne (FR)

(73) Assignee: Symantec Corporation, Mountain View, CA (US)

( * ) Notice: Subject to any disclaimer, the term of this patent is extended or adjusted under 35 U.S.C. 154(b) by 185 days.

(21) Appl. No.: 15/188,956

(22) Filed: Jun. 21, 2016

(51) Int. Cl.
  *H04L 29/06* (2006.01)
  *G06F 17/30* (2006.01)
(52) U.S. Cl.
  CPC .... *H04L 63/1433* (2013.01); *G06F 17/30961* (2013.01)
(58) Field of Classification Search
  CPC .................................................. H04L 63/1433
  See application file for complete search history.

(56) References Cited

U.S. PATENT DOCUMENTS

| | | | |
|---|---|---|---|
| 5,485,575 A * | 1/1996 | Chess | G06F 21/564 713/188 |
| 7,647,622 B1 | 1/2010 | Sobel et al. | |
| 8,181,251 B2 | 5/2012 | Kennedy | |
| 8,280,830 B2 | 10/2012 | Kennedy | |
| 8,464,345 B2 | 6/2013 | Satish et al. | |
| 8,478,708 B1 | 7/2013 | Larcom | |
| 8,631,330 B1 * | 1/2014 | Hwang | G06F 3/0484 715/707 |
| 8,635,171 B1 | 1/2014 | Kennedy | |
| 8,776,168 B1 | 7/2014 | Gibson et al. | |
| 9,081,938 B1 * | 7/2015 | Gauvin | G06F 21/10 |
| 9,594,903 B1 * | 3/2017 | L | G06F 21/561 |
| 9,762,593 B1 | 9/2017 | Kennedy et al. | |
| 9,813,437 B2 | 11/2017 | Yumer | |

(Continued)

OTHER PUBLICATIONS

Canali et al.; On the effectiveness of risk prediction based on users browsing behavior; Published in: Proceeding ASIA CCS '14 Proceedings of the 9th ACM symposium on Information, computer and communications security; 2014; pp. 171-182; ACM Digital Library (Year: 2014).*

(Continued)

*Primary Examiner* — Bradley Holder
(74) *Attorney, Agent, or Firm* — FisherBroyles, LLP

(57) ABSTRACT

The disclosed computer-implemented method for evaluating infection risks based on profiled user behaviors may include (1) collecting user-behavior profiles that may include labeled profiles (e.g., infected profiles and/or clean profiles) and/or unlabeled profiles, (2) training a classification model to distinguish infected profiles from clean profiles using features and labels of the user-behavior profiles, and (3) using the classification model to predict (a) a likelihood that a computing system of a user will become infected based on a profile of user behaviors of the user and/or (b) a likelihood that a user behavior in the user-behavior profiles will result in a computing-system infection. Various other methods, systems, and computer-readable media are also disclosed.

19 Claims, 8 Drawing Sheets

(56) References Cited

U.S. PATENT DOCUMENTS

| | | | |
|---|---|---|---|
| 9,836,603 | B2 | 12/2017 | RoyChowdhury et al. |
| 9,853,996 | B2* | 12/2017 | Eliyahu .................. G06F 21/552 |
| 2005/0120242 | A1 | 6/2005 | Mayer et al. |
| 2007/0113281 | A1* | 5/2007 | Leach .................... G06Q 40/08 726/22 |
| 2010/0083376 | A1 | 4/2010 | Pereira et al. |
| 2010/0162395 | A1 | 6/2010 | Kennedy |
| 2011/0055123 | A1 | 3/2011 | Kennedy |
| 2011/0083176 | A1* | 4/2011 | Martynenko ........... G06F 21/55 726/13 |
| 2011/0271341 | A1 | 11/2011 | Satish et al. |
| 2011/0283361 | A1 | 11/2011 | Perdisci et al. |
| 2012/0144492 | A1* | 6/2012 | Griffin .................... G06F 21/56 726/25 |
| 2013/0097701 | A1 | 4/2013 | Moyle et al. |
| 2014/0201208 | A1 | 7/2014 | Satish et al. |
| 2015/0128274 | A1* | 5/2015 | Giokas ................ H04L 63/1416 726/23 |
| 2015/0172303 | A1 | 6/2015 | Humble et al. |
| 2015/0261955 | A1* | 9/2015 | Huang .................. G06F 21/562 726/23 |
| 2015/0339477 | A1* | 11/2015 | Abrams ................ G06F 21/554 726/23 |
| 2016/0142426 | A1* | 5/2016 | Bird .................... H04L 63/1483 726/23 |

OTHER PUBLICATIONS

Lévesque et al.; Risk prediction of malware victimization based on user behavior; Published in: 2014 9th International Conference on Malicious and Unwanted Software: The Americas (MALWARE); Date of Conference: Oct. 28-30, 2014; IEEE Xplore (Year: 2014).*

Yves Grandvalet and Yoshua Bengio, Semi-supervised Learning by Entropy Minimization, Proceedings of Advances in Neural Information Processing Systems, NIPS 2004, Vancouver. 2004.

Boaz Nadler and Nathan Srebro, Semi-supervised Learning with the Graph Laplacian: the limit of infinite unlabeled data, Proceedings of Advances in Neural Information Processing Systems, NIPS 2009, USA. 2009.

Naoki Abe, Bianca Zadrozny and John Langford, Outlier detection by active learning, Proceedings of the 12th ACM SIGKDD international conference on Knowledge discovery and data mining, 2006, PA, USA. 2006.

Canali, Davide et al.; On the Effectiveness of Risk Prediction Based on Users Browsing Behavior; ASIA CCS'14, Kyoto, Japan; Jun. 4-6, 2014.

Kirat, Dhilung et al.; SigMal: A Static Signal Processing Based Malware Triage; ACSAC '13, Proceedings of the 29th Annual Computer Security Applications Conference, New Orleans, Louisiana; Dec. 9-13, 2013.

Gandotra, Ekta et al.; Malware Analysis and Classification: A Survey; Journal of Information Security, 2014, 5; Apr. 2014.

Aung, Zarni et al.; Permission-Based Android Malware Detection; www.ijstr.org; International Journal of Scientific & Technology Research vol. 2, Issue 3, ISSN 2277-8616; Mar. 2013.

Morovati, Kamran et al.; Malware Detection Through Decision Tree Classifier; CSEE 2013; 2013.

Rieck, Konrad et al.; Automatic Analysis of Malware Behavior using Machine Learning; Journal of Computer Security; 2011.

Newsome, James et al.; Polygraph: Automatically Generating Signatures for Polymorphic Worms; http://repository.cmu.edu/cgi/viewcontent.cgi?article=1028&context=ece, as accessed Nov. 17, 2015; 2005.

Rouse, Margaret; polymorphic malware; http://searchsecurity.techtarget.com/definition/polymorphic-malware, as accessed Nov. 17, 2015; Apr. 19, 2007.

Wicherski, Georg; peHash: A Novel Approach to Fast Malware Clustering; https://www.usenix.org/legacy/event/leet09/tech/full_papers/wicherski/wicherski.pdf, as accessed Nov. 17, 2015; 2009.

* cited by examiner

SYSTEMS AND METHODS FOR EVALUATING INFECTION RISKS BASED ON PROFILED USER BEHAVIORS

BACKGROUND

Malware is a constant problem for both individual users and organizations. Malware can slow down a computer, encrypt or delete important data, steal sensitive information, and cause a myriad of other problems. Many resources are already devoted to the task of protecting computing devices from malware, such as firewalls, anti-virus applications, spam filters, and anti-spyware applications. Some traditional security systems may prevent an uninfected user from downloading known malware or visiting websites that are known to be malicious. However, even protected computing systems may be at risk of becoming infected since most traditional systems struggle to keep up with the ever-growing number and types of malware Some traditional security systems may identify users that are at risk of having their computing devices infected by determining that the users exhibit behaviors that are known to be associated with malware (e.g., attempts to download known malware or visit websites that are known to be malicious). Additionally, some traditional security systems may identify users that are not at risk of having their computing devices infected by determining that the users exhibit only behaviors that are known to not be associated with malware. However, most traditional security systems are unable to determine whether other users that have not exhibited these behaviors are or are not at risk of having their computing devices infected. Accordingly, the instant disclosure identifies and addresses a need for additional and improved systems and methods for determining and reducing infection risks for these other users.

SUMMARY

As will be described in greater detail below, the instant disclosure describes various systems and methods for evaluating infection risks based on profiled user behaviors. In one example, a computer-implemented method for evaluating infection risks based on profiled user behaviors may include (1) collecting user-behavior profiles that may include labeled profiles (e.g., infected profiles and/or clean profiles) and/or unlabeled profiles, (2) training a classification model to distinguish infected profiles from clean profiles using features and labels of the user-behavior profiles, and (3) using the classification model to predict (a) a likelihood that a computing system of a user will become infected based on a profile of user behaviors of the user and/or (b) a likelihood that a user behavior in the user-behavior profiles will result in a computing-system infection. In some embodiments, the labeled profiles may include (1) infected profiles that each may include a profile of user behaviors that occurred at an associated infected computing system that is known to have encountered malware and/or (2) clean profiles that each may include a profile of user behaviors that occurred at an associated clean computing system that is known to be free of malware. In some embodiments, each of the unlabeled profiles may include a profile of user behaviors that occurred at an associated computing system that is not known to have encountered malware and not known to be free of malware.

In some embodiments, the computer-implemented method may further include assigning, before training the classification model, a pseudo label to each of the unlabeled profiles by labeling a first group of the unlabeled profiles as infected profiles and a second group of the unlabeled profiles as clean profiles. In one embodiment, the step of assigning the pseudo label to each of the unlabeled profiles may include (1) calculating a similarity between the unlabeled profile and at least one labeled profile in the labeled profiles, calculating a soft risk score for the unlabeled profile based on the similarity and a risk score of the labeled profile, and (3) labeling the unlabeled profile as either an infected profile or a clean profile based on the soft risk score. In some embodiments, the step of training the classification model may include using the soft risk score as a weighting factor of the pseudo label of the unlabeled profile.

In some embodiments, the step of assigning the pseudo label to each of the unlabeled profiles may include (1) mapping each of the unlabeled profiles to a feature space, (2) splitting the feature space into a first region and a second region along a lowest-density region of the feature space, (3) labeling unlabeled profiles in the first region as infected profiles, and (4) labeling unlabeled profiles in the second region as clean profiles. In some embodiments, the step of assigning the pseudo label to each of the unlabeled profiles may include using the classification model to reassign pseudo labels to the unlabeled profiles, and the step of training the classification model may include retraining, after reassigning pseudo labels, the classification model until the pseudo labels of the unlabeled profiles converge.

In some embodiments, the step of training the classification model may include training a decision tree to distinguish infected profiles from clean profiles. In at least one embodiment, the step of training the decision tree may include determining, at an internal node in the decision tree, a splitting rule that best minimizes a classification error of any labeled profiles at the internal node and splits a feature space to which any unlabeled profiles at the internal node are mapped along a low-density region of the feature space. In some embodiments, the step of training the decision tree may include determining, at an internal node in the decision tree, a splitting rule that maximizes mutual information. In other embodiments, the step of training the decision tree may include determining, at an internal node in the decision tree, a splitting rule that splits user-behavior profiles at the internal node into two subsets in a way that maximizes a divergence between the two subsets.

In one embodiment, a system for implementing the above-described method may include (1) a collecting module, stored in memory, that collects user-behavior profiles that may include labeled profiles (e.g., profiles labeled as infected or clean) and/or unlabeled profiles, (2) a training module, stored in memory, that trains a classification model to distinguish infected profiles from clean profiles using features and labels of the plurality of user-behavior profiles, (3) a risk-evaluating module, stored in memory, that uses the classification model to predict (a) a likelihood that a computing system of a user will become infected based on a profile of user behaviors of the user and/or (b) a likelihood that a user behavior in the user-behavior profiles will result in a computing-system infection, and (4) at least one processor that executes the collecting module, the training module, and the risk-evaluating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) collect user-behavior profiles that may include labeled profiles and/or unlabeled profiles, (2) train a classification model to distinguish infected profiles from clean profiles using features and labels of the user-behavior profiles, and (3) use the classification model to predict (a) a likelihood that a computing system of a user will become infected based on a profile of user behaviors of the user and/or (b) a likelihood that a user behavior in the user-behavior profiles will result in a computing-system infection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
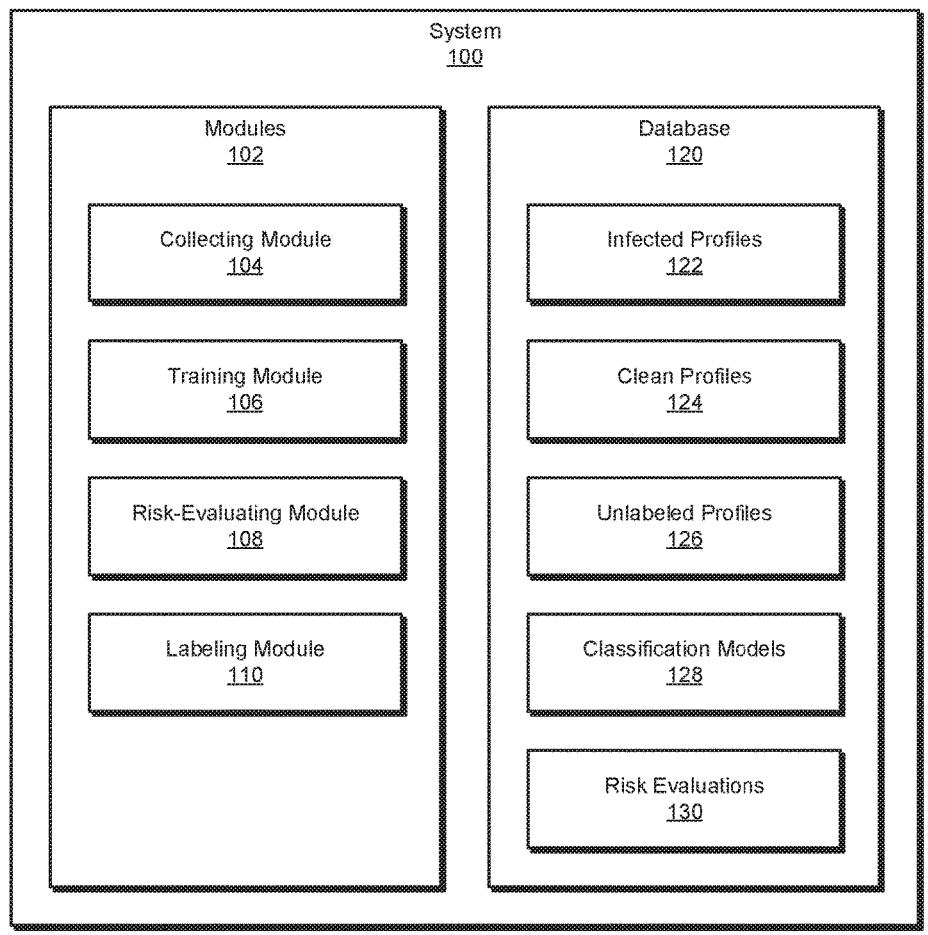
FIG. 1 is a block diagram of an exemplary system for evaluating infection risks based on profiled user behaviors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating infection risks based on profiled user behaviors. As will be explained in greater detail below, by using information about potentially but not definitively malicious user behaviors to train an infection-risk scoring model, the systems and methods described herein may enable the prediction of the risk of users' computing systems becoming infected based on the users' potentially but not definitively malicious behaviors and/or enable the identification of potentially but not definitively malicious behaviors that are most significant to computing-system infections.

Embodiments of the instant disclosure may also provide various other advantages and features, as discussed in greater detail below.

Figure 2:
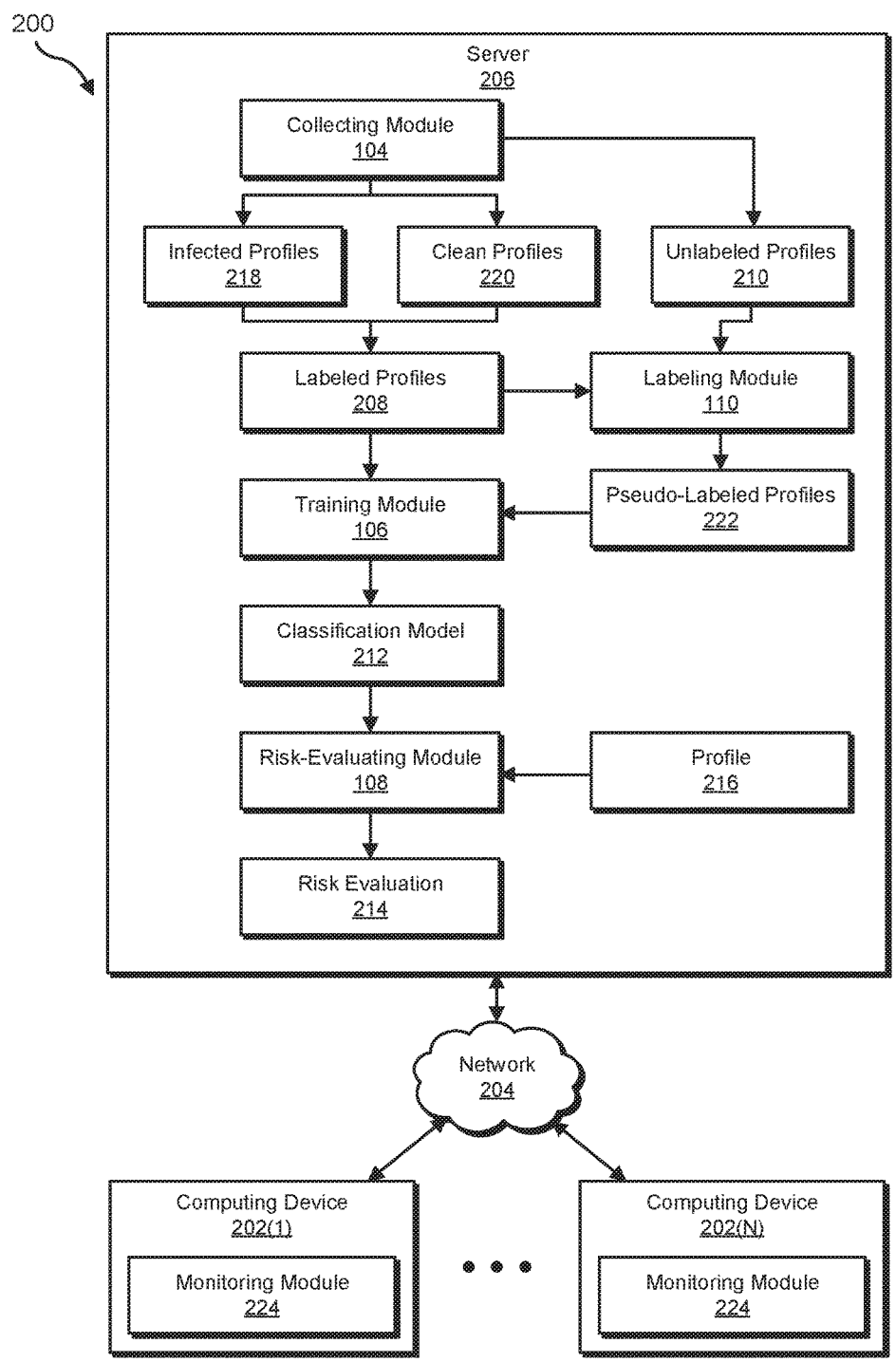
FIG. 2 is a block diagram of an additional exemplary system for evaluating infection risks based on profiled user behaviors.

The following will provide, with reference to FIGS. 1-2, detailed descriptions of exemplary systems for evaluating infection risks based on profiled user behaviors. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for evaluating infection risks based on profiled user behaviors. As illustrated in this figure, exemplary system 100 may include one or more modules 102 for performing one or more tasks. For example, and as will be explained in greater detail below, exemplary system 100 may include a collecting module 104 that collects user-behavior profiles that may include labeled profiles (e.g., profiles labeled as infected or clean) and/or unlabeled profiles. Exemplary system 100 may also include a training module 106 that trains a classification model to distinguish infected profiles from clean profiles using features and labels of the plurality of user-behavior profiles.

In addition, and as will be described in greater detail below, exemplary system 100 may include a risk-evaluating module 108 that uses the classification model to predict (1) a likelihood that a computing system of a user will become infected based at least in part on a profile of user behaviors of the user and/or (2) a likelihood that a user behavior in the user-behavior profiles will result in a computing-system infection. Exemplary system 100 may also include a labeling module 110 that assigns, before the classification model is trained, a pseudo label to each of the unlabeled profiles by labeling a first group of the unlabeled profiles as infected profiles and a second group of the unlabeled profiles as clean profiles. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include infected profiles 122 for storing information about profiles of user behaviors that occurred at infected computing systems that are known to have encountered malware, clean profiles 124 for storing information about profiles of user behaviors that occurred at clean computing systems that are known to be free of malware, unlabeled profiles 126 for storing information about profiles of user behaviors that occurred at computing systems that are not known to have encountered malware and not known to be free of malware, classification models 128 for storing information about one or more classification models, and risk evaluations 130 for storing one or more risk evaluations.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to evaluate infection risks based on profiled user behaviors. For example, and as will be described in greater detail below, one or more of modules 102 may cause computing devices 202(1)-(N) and/or server 206 to (1) collect labeled profiles 208 and/or unlabeled profiles 210, (2) train a classification model 212 to distinguish infected profiles from clean profiles using labeled profiles 208 and/or unlabeled profiles 210, and (3) use classification model 212 to generate risk evaluation 214 that predicts (a) a likelihood that a computing system of a user will become infected based at least in part on a profile 216 of user behaviors of the user and/or (b) a likelihood that a user behavior in labeled profiles 208 and/or unlabeled profiles 210 will result in a computing-system infection.

As shown in FIG. 2, labeled profiles 208 may include infected profiles 218 that each may include a profile of user behaviors that occurred at one of computing devices 202(1)-(N) that is known to have encountered malware and/or (2) clean profiles 220 that each may include a profile of user behaviors that occurred at one of computing devices 202(1)-(N) that is known to be free of malware. In some examples, each of unlabeled profiles 210 may include a profile of user behaviors that occurred at one of computing devices 202(1)-(N) that is not known to have encountered malware and not known to be free of malware. In some examples, one or more of modules 102 may cause computing devices 202(1)-(N) and/or server 206 to generate pseudo-labeled profiles 222 by assigning pseudo labels to each of unlabeled profiles 210.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device. As illustrated in FIG. 2, each of computing devices 202(1)-(N) may include a monitoring module 224 that may monitor, log, and/or transmit information about user behaviors to server 206.

Server 206 generally represents any type or form of computing device that is capable of reading computer-executable instructions, collecting user-behavior profiles, training classification models, and/or performing infection-risk evaluations. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing devices 202(1)-(N) and server 206.

Figure 3:
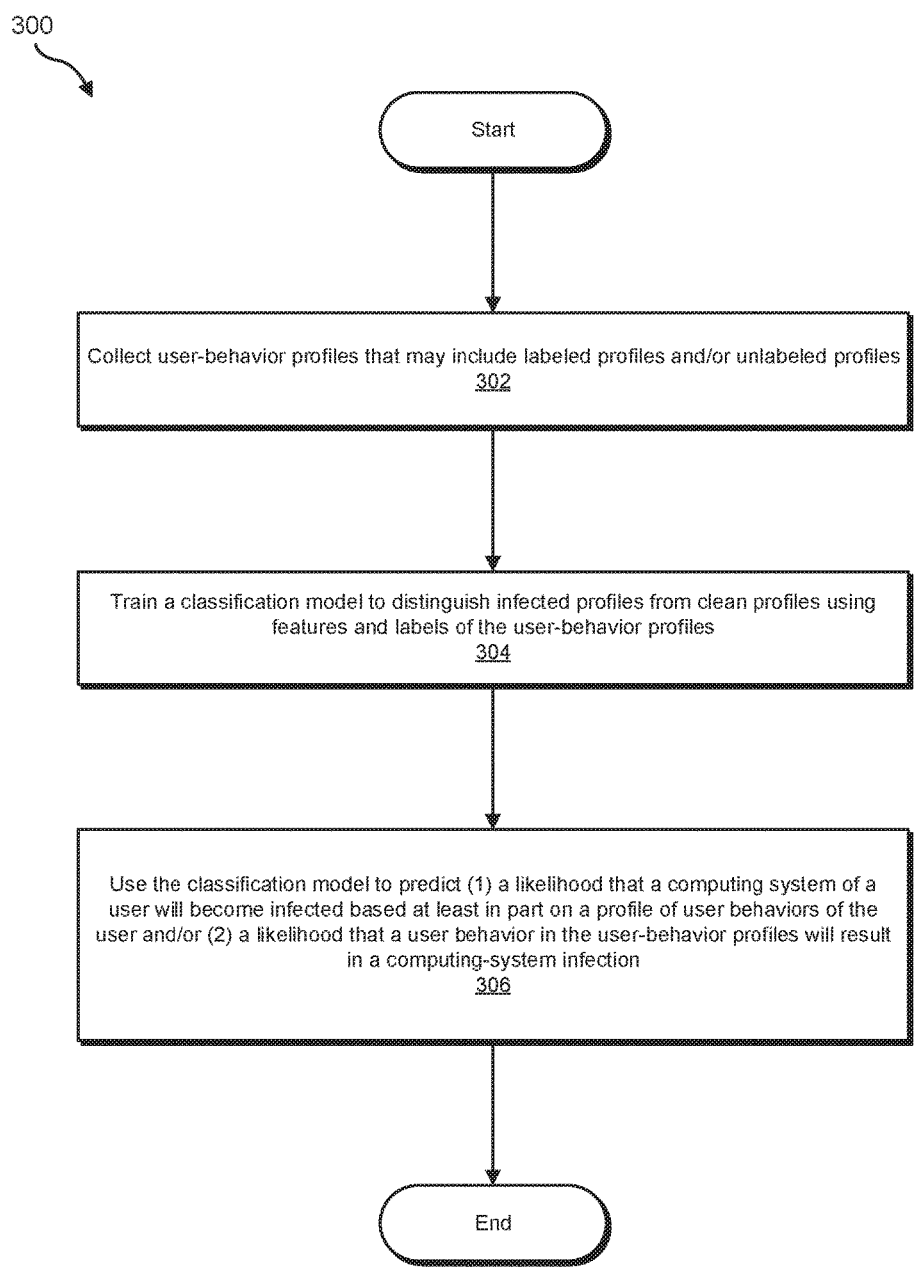
FIG. 3 is a flow diagram of an exemplary method for evaluating infection risks based on profiled user behaviors.
Figure 4:
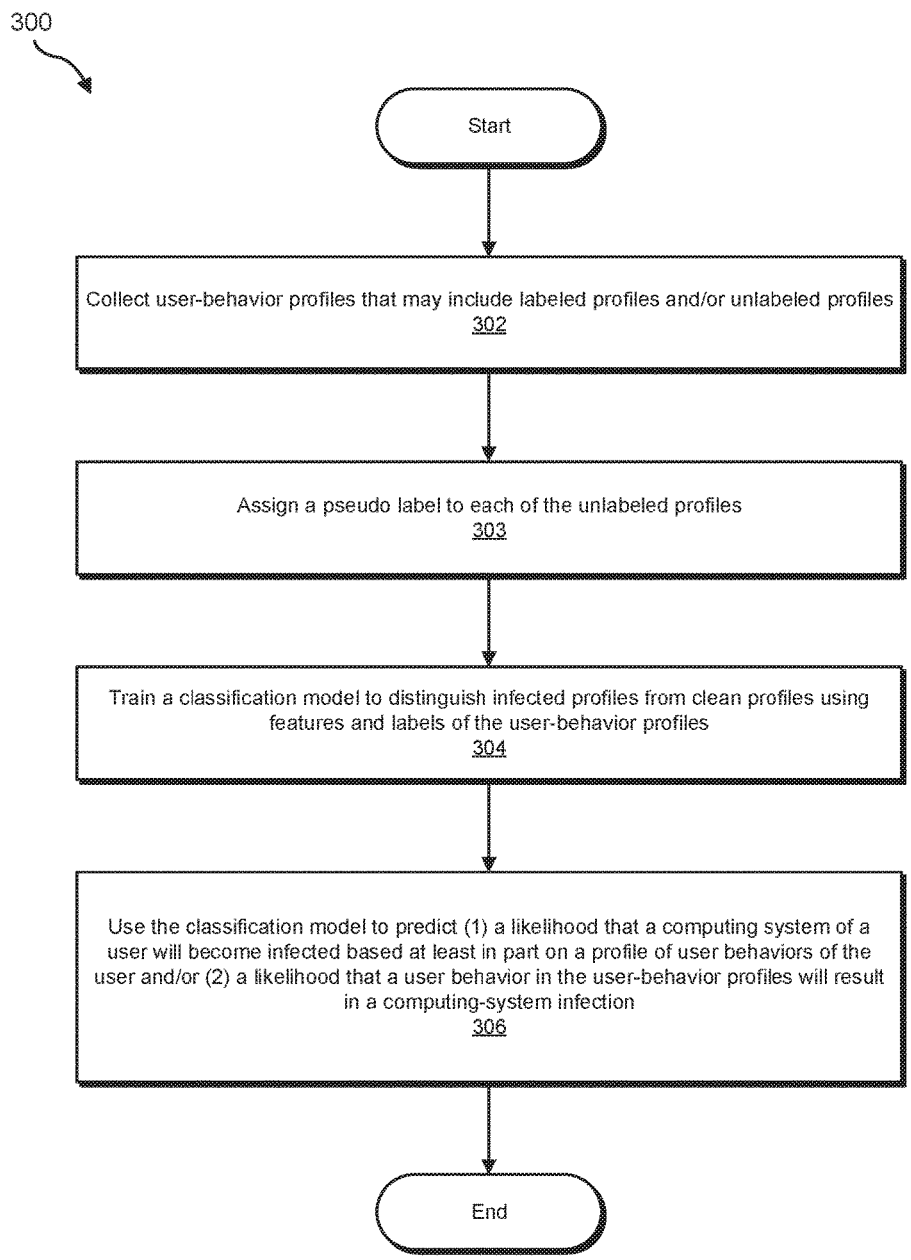
FIG. 4 is a flow diagram of an exemplary method for evaluating infection risks based on profiled user behaviors.

FIGS. 3 and 4 are flow diagrams of an exemplary computer-implemented method 300 for evaluating infection risks based on profiled user behaviors. The steps shown in FIGS. 3 and 4 may be performed by any suitable computer-executable code and/or computing system. In some embodiments, the steps shown in FIGS. 3 and 4 may be performed by one or more of the components of system 100 in FIG. 1, system 200 in FIG. 2, computing system 710 in FIG. 7, and/or portions of exemplary network architecture 800 in FIG. 8.

As illustrated in FIGS. 3 and 4, at step 302 one or more of the systems described herein may collect user-behavior profiles that may include labeled profiles and/or unlabeled profiles. For example, collecting module 104 may, as part of server 206 in FIG. 2, collect labeled profiles 208 and/or unlabeled profiles 210.

As used herein, the term "user-behavior profile" generally refers to any collection of data associated with a specific user that describes and/or summarizes the user's behaviors as observed at an end-user computing system. In some examples, a user-behavior profile may also include additional data (e.g., data about vulnerabilities of the end-user computing system). The term "user behavior," as used herein, may generally refer to any action that a user may perform on an end-user computing system. Examples of user behaviors include, without limitation, web-browsing behaviors (e.g., types of websites visited, languages used for each visited website, and/or time of visits) and file-downloading behaviors (e.g., categories of files downloaded, counts of files downloaded during particular time periods, file types, file signers, and/or application types). In some examples, a user-behavior profile may contain categorical and/or numerical behavioral attributes.

Collecting module 104 may collect user-behavior profiles in a variety of ways. For example, collecting module 104 may compile a user-behavior profile for a user by monitoring the user's behaviors and logging them to the user-behavior profile. In another example, collecting module 104 may collect a user-behavior profile of a user by receiving information about the user's behaviors from a monitoring application running on the user's computing system. Using FIG. 2 as an example, collecting module 104 may receive information about user behaviors of a user of computing device 202(1) from monitoring module 224 that detected and logged the user behaviors.

In some examples, collecting module 104 may collect infected user-behavior profiles that contain user behaviors that occurred at infected computing systems. The fact that these user behaviors occurred at infected computing systems may indicate that some or all of the user behaviors are malicious. As such, user-behavior profiles that are collected from infected computing systems and/or the user behaviors contained therein may be labeled as infected. Additionally or alternatively, collecting module 104 may label any user-behavior profiles that are collected from infected computing systems and/or the user behaviors contained therein as infected.

As used herein, the term "infected computing system" generally refers to any end-user computing system that is known to have encountered malware and/or any end-user computing system whose infection risk is or was 100%. As used herein, the term "malware" may refer to any virus, worm, Trojan horse, spyware, and/or any other malicious, illegitimate, and/or unauthorized software and/or data object. Malware may be detected by human oracles and/or a variety of malware detection systems (e.g., antivirus detectors, Intrusion Detection Systems (IDS), and/or Intrusion Prevention Systems (IPS)). In some examples, an end-user computing system may be considered to have encountered malware if malware was detected on the end-user computing system, if malware was detected on route to the end-user computing system, and/or if malware was requested from the end-user computing system.

In some examples, collecting module 104 may collect clean user-behavior profiles that contain user behaviors that occurred at clean computing systems. The fact that these user behaviors occurred at clean computing systems may indicate that some or all of the user behaviors are not malicious. As such, user-behavior profiles that are collected from clean computing systems and/or the user behaviors contained therein may be labeled as clean. Additionally or alternatively, collecting module 104 may label any user-behavior profiles that are collected from clean computing systems and/or the user behaviors contained therein as clean.

As used herein, the term "clean computing system" generally refers to any end-user computing system that is known to be free of malware and/or any end-user computing system whose infection risk is known to be zero. In some examples, an end-user computing system may be considered to be free of malware if all files on the end-user computing system are known to be benign.

In some examples, collecting module 104 may collect user-behavior profiles that contain user behaviors that occurred at computing systems that are not definitively infected or clean. The fact that these user behaviors occurred at computing systems that are not definitively infected or clean may indicate that some or all of the user behaviors are potentially but not definitively malicious user behaviors. As such, user-behavior profiles that are collected from computing systems that are neither infected or clean and/or the user behaviors contained therein may be unlabeled. In some examples, an end-user computing system may be considered neither infected nor clean if files on the end-user computing system are not definitively malicious or benign, if known malware was never detected on route to the end-user computing system, and/or if no requests for known malware originated from the end-user computing system.

In some situations, collecting module 104 may collect sufficient numbers of infected profiles and clean profiles to train an accurate classification model using only supervised training methods. In these situations, exemplary method 300 as shown in FIG. 3 may continue to step 304. In other situations, collecting module 104 may collect no or an insufficient number of infected profiles and/or no or an insufficient number of clean profiles to train a sufficiently accurate classification model using only supervised training. Additionally or alternatively, unlabeled user-behavior profiles may contain information about potentially but not definitively malicious user behaviors that may be useful in training or retraining a classification model. In these situations, exemplary method 300 as shown in FIG. 4 may continue to step 303.

At step 303, one or more of the systems described herein may assign a pseudo label to each of the unlabeled profiles. For example, labeling module 110 may, as part of server 206 in FIG. 2, generate pseudo-labeled profiles 222 by assigning a pseudo label to each of unlabeled profiles 210.

As used herein, the term "pseudo label" generally refers to any label that cannot be applied to a user-behavior profile with complete confidence. In some examples, the term "pseudo label" may refer to any label applied to a user-behavior profile that contains user behaviors that occurred at a computing system that is not definitively infected or clean.

The systems described herein may perform step 303 in any suitable manner. In one example, labeling module 110 may use a classification model (e.g., a classification model generated at step 304) to assign a pseudo label to an unlabeled profile. Using FIG. 6 as an example, labeling module 110 may generate pseudo-labeled profiles 602 by applying classification model 212(N−1) to unlabeled profiles 210.

Figure 5:
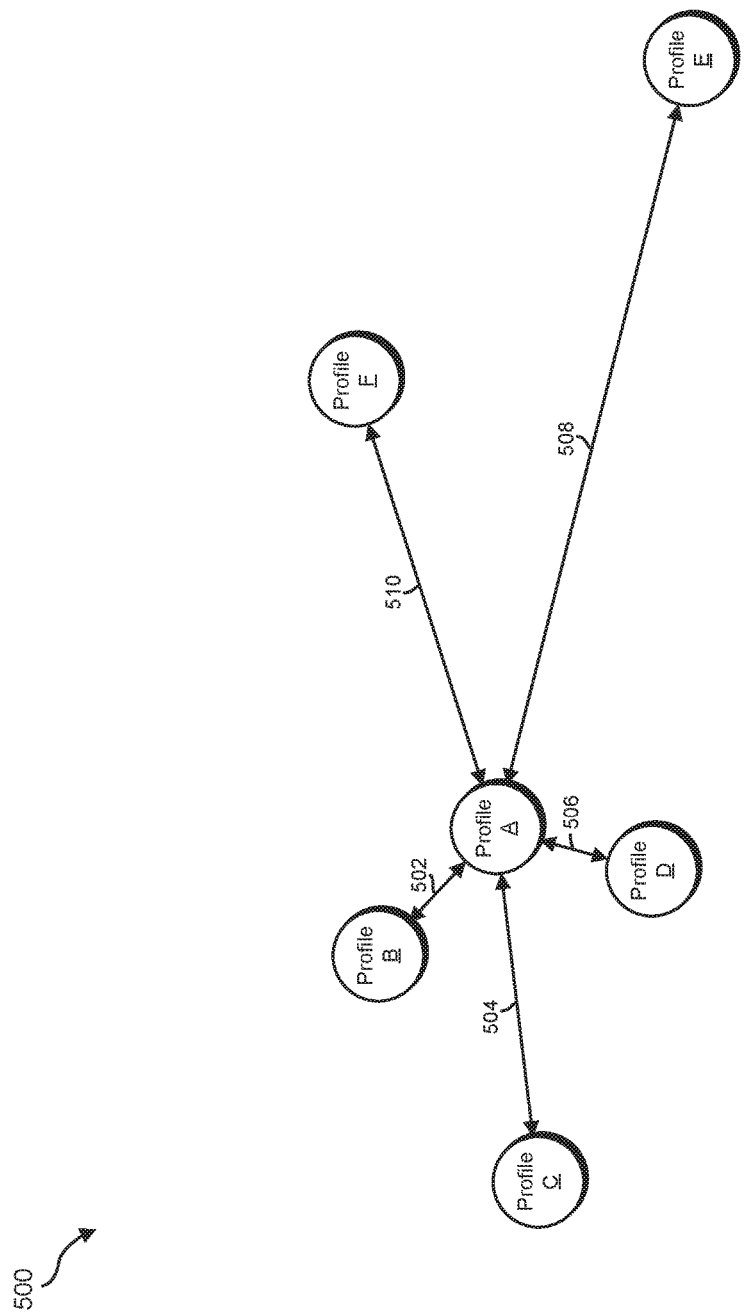
FIG. 5 is a diagram of exemplary user-behavior profiles that have been mapped to an exemplary feature space.
Figure 6:
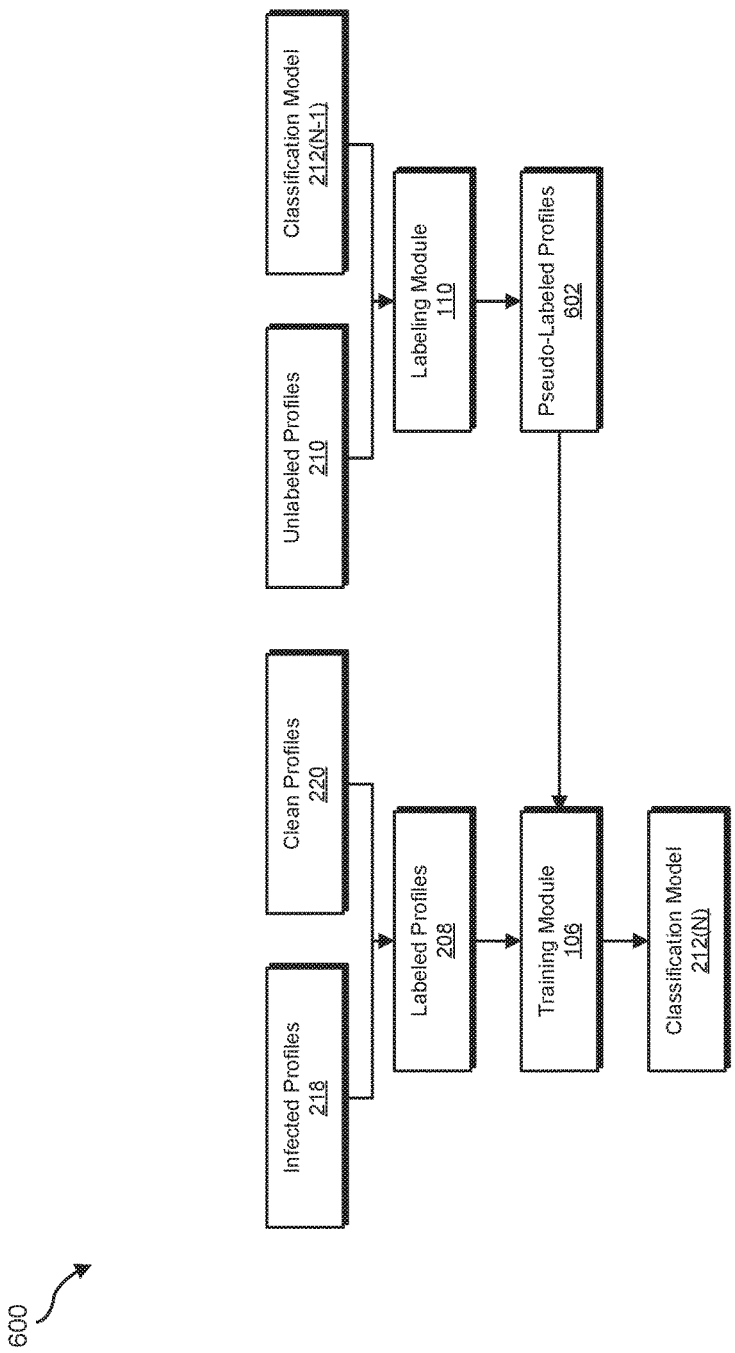
FIG. 6 is a data flow diagram of an exemplary data flow for training classification models.

Additionally or alternatively, labeling module 110 may use similarities (e.g., distances in a feature space) between unlabeled profiles and labeled profiles and the infection risks associated with the labeled profiles to iteratively propagate a soft risk score to each of the unlabeled profiles. Labeling module 110 may then assign a pseudo label to an unlabeled profile based on its soft risk score. FIG. 5 provides an example of how labeling module 110 may use similarities and risk scores to assign pseudo labels to two unlabeled profiles.

FIG. 5 illustrates six user-behavior profiles that have been mapped to a feature space 500. In this example, user-behavior profiles A and F may represent unlabeled profiles, user-behavior profiles B, C, and D may represent infected profiles, and user-behavior profile E may represent a clean profile. Since user-behavior profiles B, C, and D are definitively infected, labeling module 110 may assign them with a risk score equal to 1, which may indicate an infection risk of 100%. Since user-behavior profile F is definitively clean, labeling module 110 may assign it with a risk score equal to 0, which may indicate an infection risk of 0%.

Labeling module 110 may begin an iterative process of propagating soft risk scores to user-behavior profiles A and F by first calculating a similarity (e.g., a distance) between user-behavior profile A and each user-behavior profile in feature space 500. In this example, labeling module 110 may calculate similarities 502, 504, 506, 508, and 510 between user-behavior profile A and user-behavior profiles B, C, D, E, and F, respectively. After calculating the similarities, labeling module 110 may generate an initial soft risk score for user-behavior profile A using the following equation in which the term $R_N$ represents the risk score of a user-behavior profile N and the term $S_{MN}$ indicates a similarity between a user-behavior profile M and the user-behavior profile N:

$$R_A = \frac{S_{AB}R_B + S_{AC}R_C + S_{AD}R_D + S_{AE}R_E}{S_{AB} + S_{AC} + S_{AD} + S_{AE}}$$

After calculating an initial soft risk score for user-behavior profile A, labeling module 110 may calculate an initial risk score for user-behavior profile F in a similar manner and may take into consideration the initial soft risk score of user-behavior profile A. Labeling module 110 may continue to iteratively propagate soft risk scores to user-behavior profiles A and F until their soft risk scores converge. After the soft risk scores of user-behavior profiles A and F converge, labeling module 110 may use the soft risk scores to assign a pseudo label to user-behavior profiles A and F. In one example, labeling module 110 may label user-behavior profiles as infected profiles if their soft risk scores are high (e.g., greater than 0.5) and may label user-behavior profiles as clean profiles if their soft risk scores are low (e.g., less than 0.5).

In some examples, labeling module 110 may assign pseudo labels to unlabeled profiles by mapping each of the unlabeled profiles to a feature space and then splitting the feature space into two regions along a lowest-density region of the feature space. Labeling module 110 may then determine which region contains unlabeled profiles that are most like infected profiles and may label its unlabeled profiles as infected profiles. Similarly, labeling module 110 may determine which region contains unlabeled profiles that are most like clean profiles and may label its unlabeled profiles as clean profiles.

At step 304 in FIG. 3 or FIG. 4, one or more of the systems described herein may train a classification model to distinguish infected profiles from clean profiles using features and labels of the user-behavior profiles. For example, training module 106 may, as part of server 206 in FIG. 2, train a classification model 212 to distinguish infected profiles from clean profiles using labeled profiles 208 and/or unlabeled profiles 210. As used herein, the term "classification model" generally refers to any algorithm, heuristic, data, or combination thereof, that may be used to (1) distinguish infected profiles from clean profiles based on their features, (2) calculate a likelihood that a computing system of a user will become infected based on a profile of the user's behaviors, and/or (3) identify high-risk user behaviors that are most likely to result in a computing-system infection.

Training module 106 may train a classification model in a variety of ways. For example, training module 106 may establish a classification model by creating, training, maintaining, and/or updating all or a portion of the classification model. In one example, training module 106 may train a classification model by training a set of classifiers that are each configured to independently classify or label a user-behavior profile as either an infected profile or a clean profile and/or determine a confidence score for the classification or label. As used herein, the term "classifier" may refer to any algorithm or heuristic used to classify or label user-behavior profiles. Examples of classifiers may include, without limitation, a linear classifier, a non-linear classifier, a perceptron, a naive Bayes classifier, a support vector machine, a neural network, a decision tree, and/or any other suitable classification algorithm.

In general, training module 106 may actively train a classification model until the labels and/or the confidences that the classification model outputs converge. In some examples, the labels and/or the confidences that a classification model generates may be considered to have converged if a variation between the labels and/or the confidences and labels and/or confidences that a previous iteration of the classification model generated is less than a predetermined threshold. Using FIG. 6 as an example, the labels and/or the confidences that classification model 212 (N) outputs may be considered to have converged if the labels and/or the confidences that are output by classification model 212(N) and classification model 212(N-1) vary by less than a predetermined threshold.

In some examples, training module 106 may train a decision tree. In at least one example, training module 106 may train an ensemble of weakly supervised decision trees. In this example, training module 106 may train each decision tree in the ensemble using a different mixture of user behaviors, and each mixture of user behaviors may have been collected from different sources. When training a decision tree, training module 106 may select a suitable splitting (or partitioning) strategy to build the decision tree based on whether the user-behavior profiles that are used to build the decision tree are labeled and/or unlabeled.

In some examples, the user-behavior profiles that are used to build a decision tree may contain infected profiles, clean profiles, and unlabeled profiles. In these examples, training module 106 may select a splitting strategy that generates, at each internal node in the decision tree, a splitting rule (e.g., a splitting feature and splitting thresholds) that best minimizes a classification error of any labeled profiles at the internal node and splits a feature space to which any unlabeled profiles at the internal node are mapped along a low-density region of the feature space.

In some examples, the user-behavior profiles that are used to build a decision tree may contain unlabeled profiles and one class of labeled profiles (e.g., either infected profiles or clean profiles, but not both). In these examples, training module 106 may select a splitting strategy that generates, at each internal node in the decision tree, a splitting rule that maximizes mutual information (e.g., maximizes information gain).

In some examples, the user-behavior profiles that are used to build a decision tree may contain only unlabeled profiles. In these examples, training module 106 may select a splitting strategy that generates, at each internal node in the decision tree, a splitting rule that splits user-behavior profiles at the internal node into two subsets in a way that maximizes a divergence (e.g., Kullback-Leibler divergence) between the two subsets.

At step 306 in FIG. 3 or FIG. 4, one or more of the systems described herein may use the classification model to predict (1) a likelihood that a computing system of a user will become infected based at least in part on a profile of user behaviors of the user and/or (2) a likelihood that a user behavior in the user-behavior profiles will result in a computing-system infection. For example, risk-evaluating module 108 may, as part of server 206 in FIG. 2, use classification model 212 to generate risk evaluation 214 that predicts (a) a likelihood that a computing system of a user will become infected based at least in part on a profile 216 of user behaviors of the user and/or (b) a likelihood that a user behavior in labeled profiles 208 and/or unlabeled profiles 210 will result in a computing-system infection.

Risk-evaluating module 108 may use a classification model trained at step 304 to perform a variety of infection-risk evaluations. For example, risk-evaluating module 108 may use the classification model to determine a user's infection risk (e.g., a likelihood that a computing system of the user will become infected in the future). In one example, risk-evaluating module 108 may calculate an infection risk score for a user that is based on or equal to the confidence score (or probability score) of the label that is assigned by the classification model to a profile of the user's behaviors. For example, if a profile of a user's behaviors is labeled as an infected profile with a high confidence score, risk-evaluating module 108 may assign a relatively high infection risk score to the user. After calculating an infection risk score for a user, risk-evaluating module 108 may provide the infection risk score to an interested party (e.g., the user or an owner or administrator of the user's computing system).

In some examples, risk-evaluating module 108 may calculate an infection risk score for each member of a group of users and may use the calculated infection risk scores to identify a list of users that have the highest risks. In some examples, risk-evaluating module 108 may provide the list to an interested party as an early-detection alert. In some examples, the interested party may use the list to prioritize their security efforts. In other examples, risk-evaluating module 108 may use the list to identify a list of computing systems that are most likely to become infected and may provide the list to an interested party as an early-detection alert.

In addition to or as an alternative to determining a user's infection risk, risk-evaluating module 108 may use a classification model to identify user behaviors that are likely to cause security issues. For example, a decision tree typically works by grouping users according to their behaviors into separate clusters, and each of these clusters may be associated with a decision-branch rule set that contains the splitting features and the splitting thresholds that define the cluster. In one example, risk-evaluating module 108 may use the decision-branch rule sets associated with clusters of infected profiles to identify risky user behaviors and evaluate the significance of each user behavior in inferring users' infection risks. In general, risk-evaluating module 108 may determine a significance of each user behavior identified in a decision-branch rule set based on the order of the user behavior in the decision-branch rule set (e.g., the user behaviors that are first in the order may be considered most significant). Upon completion of step 306, exemplary method 300 in FIG. 3 may terminate.

As explained above, by using information about potentially but not definitively malicious user behaviors to train an infection-risk scoring model, the systems and methods described herein may enable the prediction of the risk of users' computing systems becoming infected based on the users' potentially but not definitively malicious behaviors and/or enable the identification of potentially but not definitively malicious behaviors that are most significant to computing-system infections.

Figure 7:
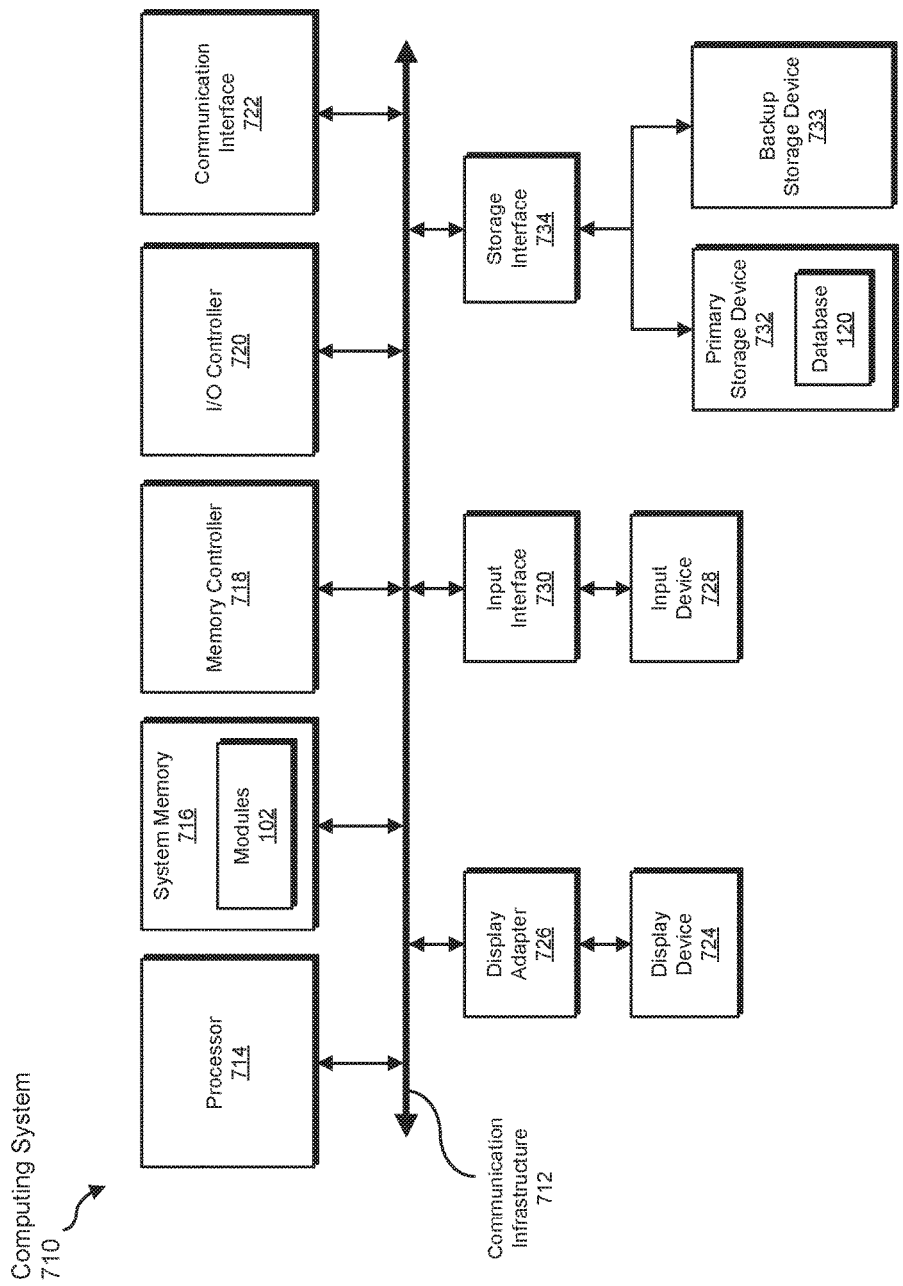
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
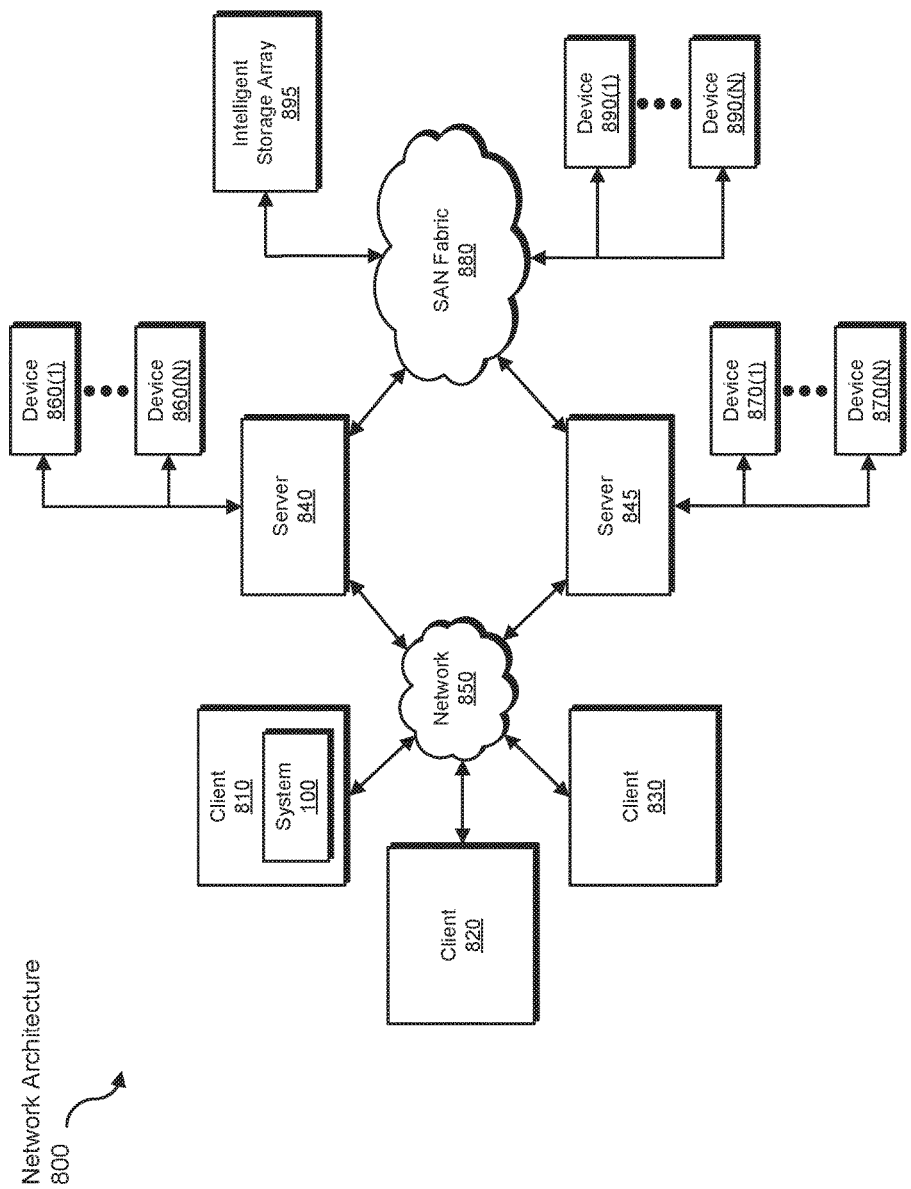
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for evaluating infection risks based on profiled user behaviors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive labeled and/or unlabeled user-behavior profiles to be transformed, transform the user-behavior profiles into a classification model that can distinguish infected profiles from clean profiles, output a result of the transformation to a risk-evaluating system, use the result of the transformation to predict (a) a likelihood that a computing system of a user will become infected based at least in part on a profile of user behaviors of the user and/or (b) a likelihood that a user behavior in the user-behavior profiles will result in a computing-system infection, and store the result of the transformation to a classification-model storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating infection risks based on profiled user behaviors, at least a portion of the method being performed by a computing device comprising at least one hardware processor, the method comprising:
    collecting, by the computing device comprising the at least one hardware processor, a plurality of user-behavior profiles that comprises at least one of:
        a plurality of labeled profiles that comprises at least one of:
            a plurality of infected profiles, wherein each of the plurality of infected profiles comprises a profile of user behaviors that occurred at an associated infected computing system that is known to have encountered malware; or
            a plurality of clean profiles, wherein each of the plurality of clean profiles comprises a profile of user behaviors that occurred at an associated clean computing system that is known to be free of malware; or a plurality of unlabeled profiles, wherein each of the plurality of unlabeled profiles comprises a profile of user behaviors that occurred at an associated computing system that is not known to have encountered malware and not known to be free of malware;

training, using features and labels of the plurality of user-behavior profiles, a decision tree to distinguish infected profiles from clean profiles by:

determining, at each internal node in the decision tree, whether there are any infected profiles, clean profiles, or unlabeled profiles at the internal node; and selecting, from a plurality of splitting rules based on whether there are any infected profiles, clean profiles, or unlabeled profiles at the internal node, a suitable splitting rule to apply at the internal node; and using the decision tree to predict at least one of:

a likelihood that a computing system of a user will become infected based at least in part on a profile of user behaviors of the user; or a likelihood that a user behavior in the plurality of user-behavior profiles will result in a computing-system infection.

2. The computer-implemented method of claim 1, further comprising assigning, before training the decision tree, a pseudo label to each of the plurality of unlabeled profiles by labeling a first group of the plurality of unlabeled profiles as infected profiles and a second group of the plurality of unlabeled profiles as clean profiles.

3. The computer-implemented method of claim 2, wherein assigning the pseudo label to each of the plurality of unlabeled profiles comprises:

calculating a similarity between the unlabeled profile and at least one labeled profile in the plurality of labeled profiles;

calculating a soft risk score for the unlabeled profile based at least in part on the similarity and a risk score of the labeled profile;

labeling the unlabeled profile as either an infected profile or a clean profile based at least in part on the soft risk score.

4. The computer-implemented method of claim 3, wherein training the decision tree comprises using the soft risk score as a weighting factor of the pseudo label of the unlabeled profile.

5. The computer-implemented method of claim 2, wherein assigning the pseudo label to each of the plurality of unlabeled profiles comprises:

mapping each of the plurality of unlabeled profiles to a feature space;

splitting the feature space into a first region and a second region along a lowest-density region of the feature space;

labeling unlabeled profiles in the first region as infected profiles;

labeling unlabeled profiles in the second region as clean profiles.

6. The computer-implemented method of claim 2, wherein:

assigning the pseudo label to each of the plurality of unlabeled profiles comprises using the decision tree to reassign pseudo labels to the plurality of unlabeled profiles;

training the decision tree comprises retraining, after reassigning pseudo labels, the decision tree until the pseudo labels of the plurality of unlabeled profiles converge.

7. The computer-implemented method of claim 1, wherein the plurality of splitting rules comprises a splitting rule that best:

minimizes a classification error of any labeled profiles at an internal node; and splits a feature space to which any unlabeled profiles at the internal node are mapped along a low-density region of the feature space.

8. The computer-implemented method of claim 1, wherein the plurality of splitting rules comprises a splitting rule that maximizes mutual information.

9. The computer-implemented method of claim 1, wherein the plurality of splitting rules comprises a splitting rule that splits user-behavior profiles at an internal node into two subsets in a way that maximizes a divergence between the two subsets.

10. The computer-implemented method of claim 1, wherein using the decision tree comprises using the decision tree to predict the likelihood that the computing system of the user will become infected.

11. The computer-implemented method of claim 1, wherein using the decision tree comprises using the decision tree to predict the likelihood that the user behavior will result in a computing-system infection.

12. A system for evaluating infection risks based on profiled user behaviors, the system comprising:

a hardware processor;

a collecting module, with instructions stored in memory and executed by the hardware processor, that collects a plurality of user-behavior profiles that comprises at least one of:

a plurality of labeled profiles that comprises at least one of:

a plurality of infected profiles, wherein each of the plurality of infected profiles comprises a profile of user behaviors that occurred at an associated infected computing system that is known to have encountered malware; or a plurality of clean profiles, wherein each of the plurality of clean profiles comprises a profile of user behaviors that occurred at an associated clean computing system that is known to be free of malware; or a plurality of unlabeled profiles, wherein each of the plurality of unlabeled profiles comprises a profile of user behaviors that occurred at an associated computing system that is not known to have encountered malware and not known to be free of malware;

a training module, with instructions stored in memory and executed by the hardware processor, that trains, using features and labels of the plurality of user-behavior profiles, a decision tree to distinguish infected profiles from clean profiles by:

determining, at each internal node in the decision tree, whether there are any infected profiles, clean profiles, or unlabeled profiles at the internal node; and selecting, from a plurality of splitting rules based on whether there are any infected profiles, clean profiles, or unlabeled profiles at the internal node, a suitable splitting rule to apply at the internal node; and a risk-evaluating module, with instructions stored in memory and executed by the hardware processor, that uses the decision tree to predict at least one of:

a likelihood that a computing system of a user will become infected based at least in part on a profile of user behaviors of the user; or a likelihood that a user behavior in the plurality of user-behavior profiles will result in a computing-system infection.

13. The system of claim 12, further comprising a labeling module, with instructions stored in memory and executed by the hardware processor, that assigns, before the decision tree is trained, a pseudo label to each of the plurality of unlabeled profiles by labeling a first group of the plurality of unlabeled profiles as infected profiles and a second group of the plurality of unlabeled profiles as clean profiles.

14. The system of claim 13, wherein the labeling module assigns the pseudo label to each of the plurality of unlabeled profiles by:
   calculating a similarity between the unlabeled profile and at least one labeled profile in the plurality of labeled profiles;
   calculating a soft risk score for the unlabeled profile based at least in part on the similarity and a risk score of the labeled profile;
   labeling the unlabeled profile as either an infected profile or a clean profile based at least in part on the soft risk score.

15. The system of claim 13, wherein the labeling module assigns the pseudo label to each of the plurality of unlabeled profiles by:
   mapping each of the plurality of unlabeled profiles to a feature space;
   splitting the feature space into a first region and a second region along a lowest-density region of the feature space;
   labeling unlabeled profiles in the first region as infected profiles;
   labeling unlabeled profiles in the second region as clean profiles.

16. The system of claim 13, wherein:
   the labeling module assigns the pseudo label to each of the plurality of unlabeled profiles by using the decision tree to assign pseudo labels to the plurality of unlabeled profiles;
   the training module trains the decision tree by retraining the decision tree until the pseudo labels of the plurality of unlabeled profiles converge.

17. The system of claim 12, wherein the risk-evaluating module uses the decision tree by using the decision tree to predict the likelihood that the computing system of the user will become infected.

18. The system of claim 12, wherein the risk-evaluating module uses the decision tree by using the decision tree to predict the likelihood that the user behavior will result in a computing-system infection.

19. A non-transitory computer-readable medium comprising one or more computer-executable instructions that, when executed by at least one hardware processor of a computing device, cause the computing device to:
   collect a plurality of user-behavior profiles that comprises at least one of:
      a plurality of labeled profiles that comprises at least one of:
         a plurality of infected profiles, wherein each of the plurality of infected profiles comprises a profile of user behaviors that occurred at an associated infected computing system that is known to have encountered malware; or
         a plurality of clean profiles, wherein each of the plurality of clean profiles comprises a profile of user behaviors that occurred at an associated clean computing system that is known to be free of malware; or
      a plurality of unlabeled profiles, wherein each of the plurality of unlabeled profiles comprises a profile of user behaviors that occurred at an associated computing system that is not known to have encountered malware and not known to be free of malware;
   train, using features and labels of the plurality of user-behavior profiles, a decision tree to distinguish infected profiles from clean profiles by:
      determining, at each internal node in the decision tree, whether there are any infected profiles, clean profiles, or unlabeled profiles at the internal node; and
      selecting, from a plurality of splitting rules based on whether there are any infected profiles, clean profiles, or unlabeled profiles at the internal node, a suitable splitting rule to apply at the internal node; and
   use the decision tree to predict at least one of:
      a likelihood that a computing system of a user will become infected based at least in part on a profile of user behaviors of the user; or
      a likelihood that a user behavior in the plurality of user-behavior profiles will result in a computing-system infection.

* * * * *